2 Sheets. Sheet 1.

S. A. Bailey.
Clothes Wringers.

No. 2,609. Reissued May 14, 1867.

Witnesses;
A. Bentley
Robt. McC. Lord

Inventor;
S. A. Bailey

N. PETERS, PHOTO-LITHOGRAPHER, WASHINGTON, D. C.

2 Sheets. Sheet 2.

S. A. Bailey,
Clothes Wringers.

No. 2,609. Reissued May 14, 1867.

Witnesses;

A. P. Merrill

Robt. M. C. Lord

Inventor;

S. A. Bailey

N. PETERS, PHOTO-LITHOGRAPHER, WASHINGTON, D. C.

UNITED STATES PATENT OFFICE.

THE BAILEY WASHING AND WRINGING MACHINE COMPANY, OF WOONSOCKET, RHODE ISLAND, ASSIGNEES, BY MESNE ASSIGNMENTS, OF SELDEN A. BAILEY.

IMPROVED MACHINE FOR WRINGING CLOTHES.

Specification forming part of Letters Patent No. 23,436, dated April 5, 1859; reissue No. 1,710, dated June 28, 1864; reissue No. 2,609, dated May 14, 1867.

*To all whom it may concern:*

Be it known that SELDEN A. BAILEY, of New London, in the county of New London and State of Connecticut, heretofore invented certain new and useful Improvements in Machines for Wringing Clothes, for which Letters Patent were granted to him on the 5th day of April, 1859.

Also, be it known that the said SELDEN A. BAILEY has in due form of law assigned his whole interest in said invention, improvements, and Letters Patent to Selden A. Bailey, Simeon S. Cook, and Benedict M. Cook, under date of December 16, 1863, who in turn assigned their entire right, title, and interest in the aforesaid patent, reissued to them on the 28th day of June, 1864, to the "Bailey Washing and Wringing Machine Company," (incorporated and doing business at Woonsocket, Rhode Island,) on the 22d day of July, 1865.

Now, therefore, we, the aforesaid "Bailey Washing and Wringing Machine Company," assignees, as aforesaid, by virtue of the statute in such case made and provided, do hereby declare the following to be a full, clear, and exact description of the invention, reference being had to the annexed drawings, making part of this specification, in which—

Figure 1:
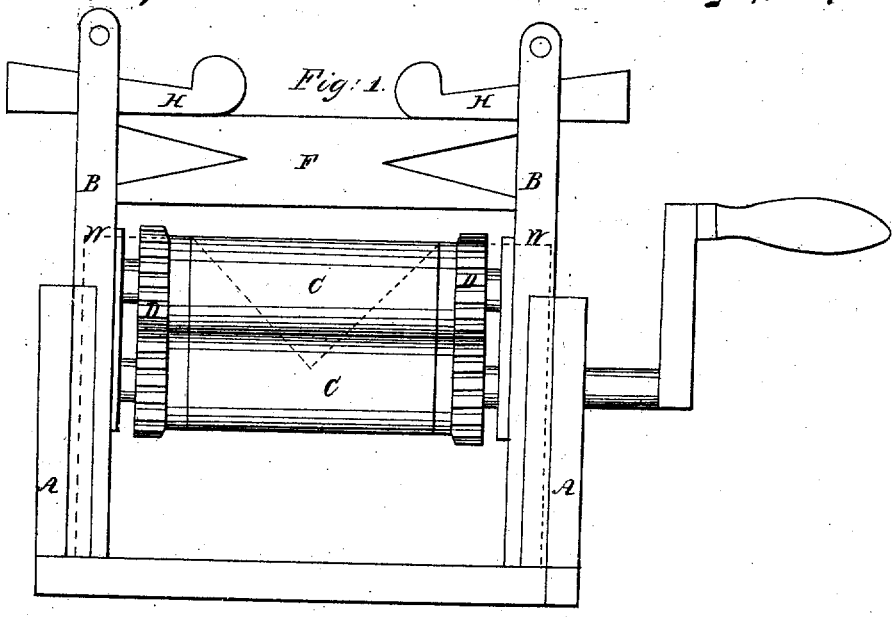
Figure 3:
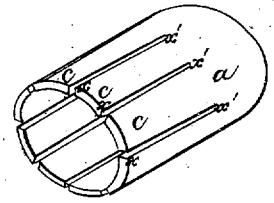
Figure 4:
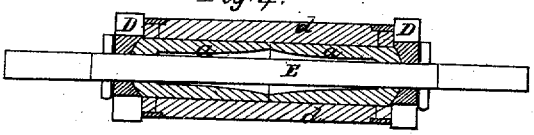
Figure 2:
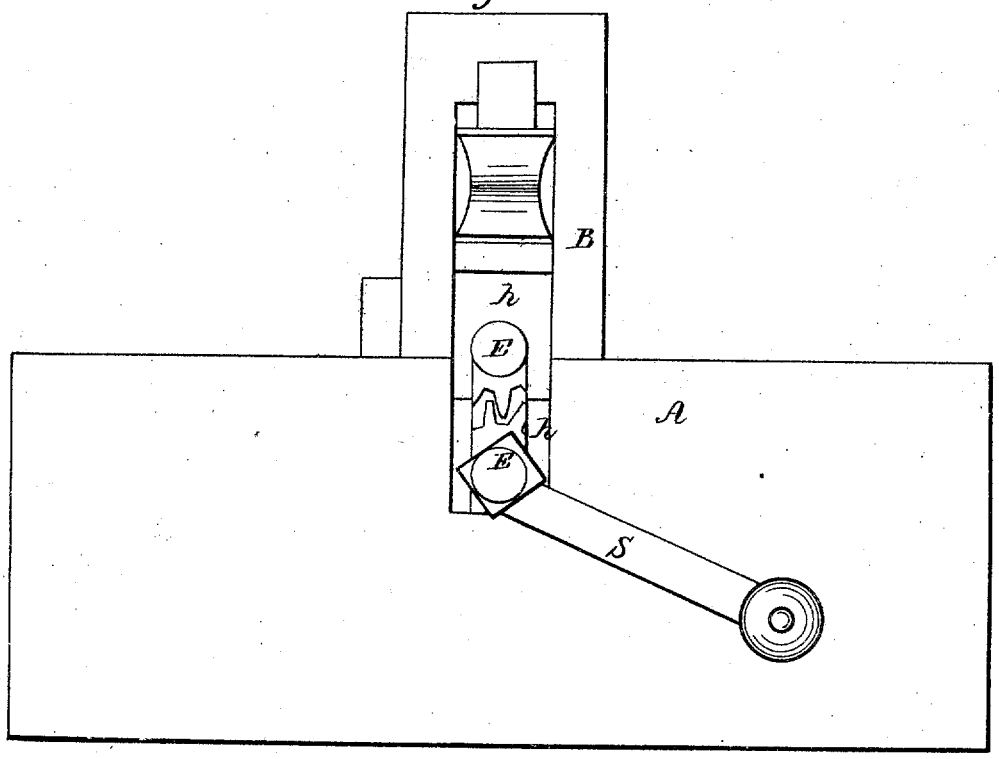

Figure 1 is an end view of the machine with one end removed. Fig. 2 is a side view. Fig. 3 is a perspective of one-half of the wooden spring. Fig. 4 is a longitudinal section of one of the rollers.

The drawings are amended by representing the screws *n n* in their proper places.

In the drawings, A represents a vessel, which may be of any convenient size and form to hold the clothes and receive the water as it is pressed from them by the action of the machine. Attached to said vessel by screws *n n*, and extending upward above its top, are two perpendicular supports, B B, said supports or standards being constructed with a rectangular slot or groove through them, in which the journal-bearings *h h* are allowed to move up and down freely. C C represent two cylinders, through which pass the shafts E E, said shafts having their bearings in the journal-boxes *h h*. The cylinder C is seen in section in Fig. 4. *a a* represent a cylindrical wooden spring-piece, which passes over the shaft E. This piece is divided transversely at its center, as is shown, and its two sections are provided with a conical bore, the bases of the cones being placed together. These conical holes extend to almost the outward ends of the piece *a*, and are slotted from their place of division toward their outer ends, as from *x* to *x'*. In Fig. 3, *c c c* are the slats formed by thus slotting these pieces. The holes are much thicker at *x'* than they are at *x*, and the consequence is that when the piece *a* is placed or slipped over the shaft E it will act as a spring, which yields at its center, but does not at its ends. *d d* represent a cylindrical piece of india-rubber, which passes over the wooden spring-piece *a*. D D represent gear-wheels, which are secured on the shaft E. These gear-wheels are beveled on their sides which are presented to the piece *a;* and the outer ends of the piece *a* are also beveled to correspond with the bevel of the gear-wheels, and fit in said gear-wheels, as is shown in Fig. 4. F is a bar which rests above the journal-boxes *h h*, the ends of said bar bearing upon blocks placed upon the boxes *h*. A V-shaped piece is cut out of the ends of the bar F, so that when the boxes *h h* bear heavily against its ends they will yield slightly. H H represent wedges, which are placed over the bar F for the purpose of keeping it down, and for pressing the cylinders tighter together. M M, (seen in dotted lines,) is a guide for directing the clothes toward the centers of the cylinders. In wringing clothes with the machine, they are passed between the rollers C C by turning the handle S, the cylinders being close together, and a sufficient pressure is obtained for small articles. A corresponding pressure is obtained for large ones, as it requires much force to bear in the spring-slats *c c c* when articles of large bulk pass through. We form, by this method, a spring-roller, by means of which we can obtain more pressing force at less cost than we can by any other mode. It will be seen also that as the water is pressed from the clothes by the rollers it will fall into the vessel A and cause an avoidance of a disagreeably wet floor.

We are aware that a patent has been granted to Mr. Allender for a machine which employs a roller that yields at its center; but we disclaim all such parts of his invention as may be found in this machine, confining ourselves to the devices and arrangement above described.

Having thus fully described said invention, what we claim therein as new, and desire to secure by Letters Patent, is—

1. The employment of the wooden spring-piece *a a*, which is divided into two parts at its center, each part being slotted from the place of division, as shown in the drawing, toward its outer end, the same being covered by rubber cylinder, substantially in the manner and for the purpose specified.

2. The spring F, in combination with elastic rollers, for the purpose set forth.

3. We claim, in a wringing-machine substantially of the kind herein described, the combination of elastic rollers impervious to water with the standards B and vessel A, secured and operated substantially as and for the purpose specified.

SELDEN A. BAILEY,
*General Agent for the Bailey Washing and Wringing Machine Company.*

Witnesses:
J. Y. KNIGHT,
GUY C. HUMPHRIES.

2